United States Patent [19]
Davis

[11] Patent Number: 6,009,990
[45] Date of Patent: Jan. 4, 2000

[54] PALLET TRANSFER AND CLAMPING UNIT

[76] Inventor: William P. Davis, 46763 Springhill, Shelby Township, Mich. 48317

[21] Appl. No.: 09/009,548

[22] Filed: Jan. 20, 1998

[51] Int. Cl.[7] .................................................. B65G 37/00
[52] U.S. Cl. ...................................... 198/346.3; 198/346.1
[58] Field of Search ............................ 198/345.1, 345.2, 198/345.3, 346.1, 346.3, 861.1

[56] References Cited

U.S. PATENT DOCUMENTS

| | | | |
|---|---|---|---|
| 3,934,375 | 1/1976 | Hornstein | 51/101 R |
| 4,217,977 | 8/1980 | Tam | 198/346.2 X |
| 4,239,445 | 12/1980 | Ozawa | 198/345.3 X |
| 4,552,260 | 11/1985 | Teagno et al. | 198/345.3 |
| 4,656,949 | 4/1987 | Ragot | 104/172.3 |
| 4,681,208 | 7/1987 | Harringer et al. | 198/341 |
| 4,881,633 | 11/1989 | Cailey et al. | 198/345 |
| 4,928,806 | 5/1990 | Anderson et al. | 198/345 |
| 4,991,707 | 2/1991 | Alexander et al. | 198/346.1 |
| 5,133,444 | 7/1992 | Thomason | 198/345.1 |
| 5,213,192 | 5/1993 | Kuse | 198/345.3 |
| 5,242,043 | 9/1993 | Sturm | 198/345.3 |
| 5,398,802 | 3/1995 | Clopton | 198/465.1 |

*Primary Examiner*—James R. Bidwell
*Attorney, Agent, or Firm*—Young & Basile, P.C.

[57] ABSTRACT

A modular transfer and clamping unit for positioning in alignment with a pallet conveyor system. The unit having a stationary base and a secondary frame communicating with and movable relative to the stationary base. The secondary frame having a pair of in-line sprockets at opposite ends of the secondary frame and an endless conveyor trained around the sprockets. A motor drive drives the endless conveyor. A hydraulic driven wedge assembly moves the secondary frame relative to the stationary base between a first position wherein the secondary frame is aligned with the pallet conveyor system and the second position wherein the secondary frame is displaced vertically below and parallel the first position in locked engagement with the stationary base to provide precise and repeatable pallet location while at a work station.

15 Claims, 4 Drawing Sheets

PALLET TRANSFER AND CLAMPING UNIT

FIELD OF THE INVENTION

The present invention relates to a modular pallet transfer and clamping unit for use in a linear path conveyor system.

BACKGROUND OF THE INVENTION

The vast majority of present day industries utilize a pallet transfer system for holding devices being constructed along an assembly line type of operation. For example, a device may be placed on a pallet moving along a transfer mechanism between numerous work stations. At each work station, the device being held by the pallet receives individual attention such as further machining or assembly. An important requirement for such a system is precise location of the workpieces at the work stations. To accommodate this requirement can greatly increase the cost of building a pallet transfer system.

In typical transfer mechanisms, the pallet is moved from the conveyor system to a position where it can be locked at the work station. Once the work has been completed at the work station, the pallet then is transferred back onto the transfer mechanism for movement to its next assignment. This assembly configuration further adds to the cost of the manufacturing system.

The present invention is directed to a transfer device that provides a conveying path and further functions as a clamping device to assure placement of the pallet relative to the work station within the desired degree of precision by means of a relatively simple self aligning mechanism.

SUMMARY OF THE INVENTION

In accordance with the present invention, a modular conveying system is mounted within a fixed conveying path defined by a conveyor system. The modular system is incorporated at the location of a work station and provides a continuation of the transfer mechanism as well as a clamping unit for the work station. The modular unit of the present invention includes a stationary base member and a secondary frame member interconnected such that the secondary frame member is movable relative to the stationary base member. The secondary frame member includes a pair of in-line sprockets at opposite ends of the secondary frame member and having an endless conveyor trained around the sprockets. The secondary frame member is movable relative to the stationary base member between a first position wherein the endless conveyor of the secondary frame member is aligned with the linear path of a conveyor system and a second position wherein the endless conveyor and secondary frame member are located in a displaced parallel offset relationship from the first position. The modular transfer and clamping unit further includes means for locking the secondary frame member in the second position so that the necessary task may proceed at the work station. Each successive pallet and its workpiece is also precisely and repeatedly positioned in the same location for the required task by the work station by locking the secondary frame in the second position. The modular transfer and clamping unit further aligns and balances the secondary frame member relative to the stationary base when in the first position to maintain the endless conveyor on a level plane as a pallet enters and leaves the modular transfer and clamping unit. When the secondary frame member is in the first position, the endless conveyor is in planar alignment with the linear path of the conveyor system so that the path of the pallet is uninterrupted.

It is desirable to provide a modular transfer and clamping apparatus that can be incorporated into a pallet transfer system that is easily movable for various configurations. It is also desirable to provide a generic unit that may be used for various manufacturing steps that can easily be transferred to another utility work station during manufacturing changeover plans. It is also desirable to provide a modular unit that is capable of handling up to a 1200 pound pallet and workpiece assembly. In addition, it is desirable to provide a modular unit that is capable of clamping the pallet unit at the work station in a repeatable and precise location.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
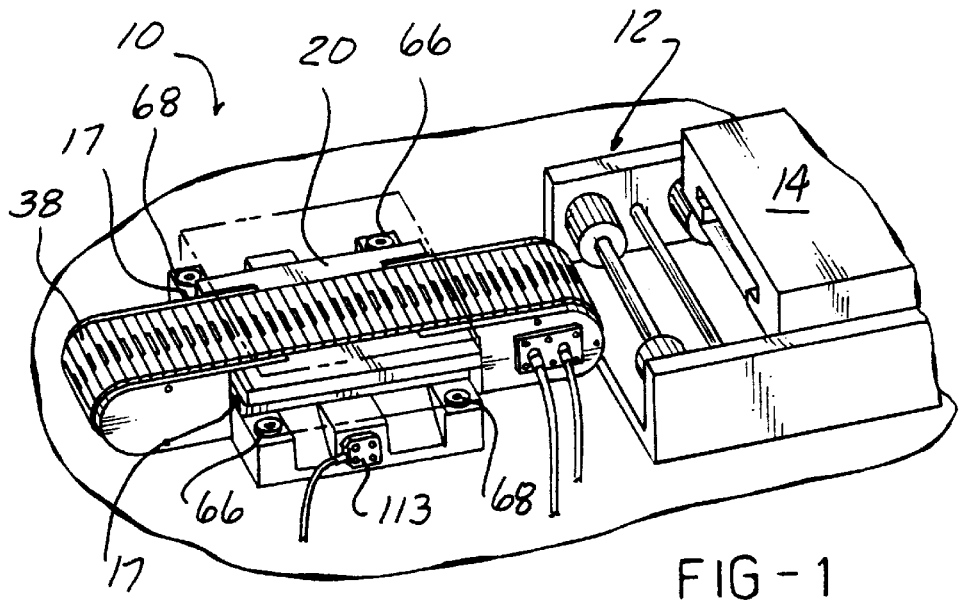
FIG. 1 is a perspective view of the pallet transfer and clamping unit of the present invention shown in alignment with a conveyor system for the transfer of pallets.
Figure 5:
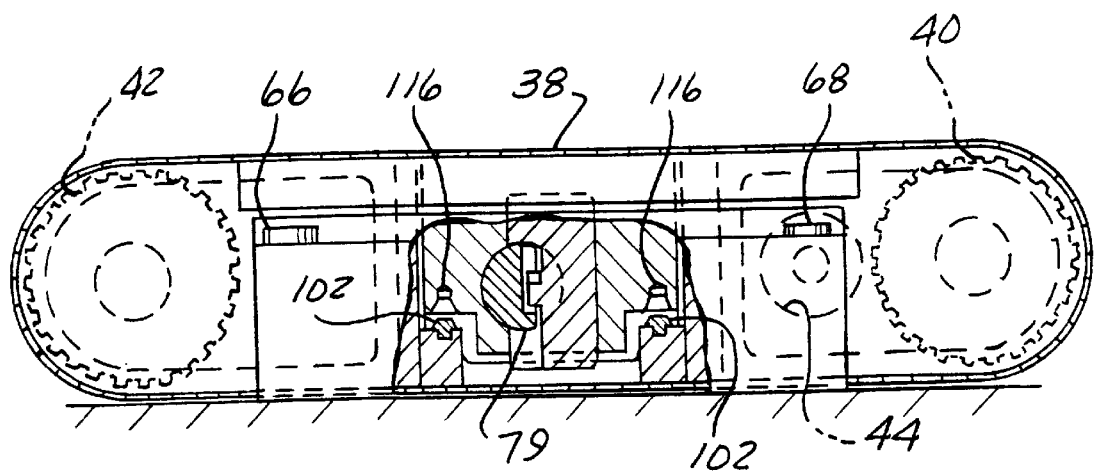
FIG. 5 is a sectional side view of the pallet transfer and clamping unit showing the wedge assembly for raising and lowering the secondary frame.

In FIG. 1 there is shown a perspective view of a single pallet transfer and clamping unit 10. The pallet transfer and clamping unit 10 is preferably located in linear alignment with a conveyor system 12 carrying pallets 14 from one work station, represented as W in FIG. 7, to another. The pallet transfer and clamping unit 10 is preferably located at each work station W to provide automatic delivery and precise locating, clamping and holding of the machine tool pallet 14 having a workpiece (not shown) attached which will have precision work performed on it at the work station W.

Figure 2:
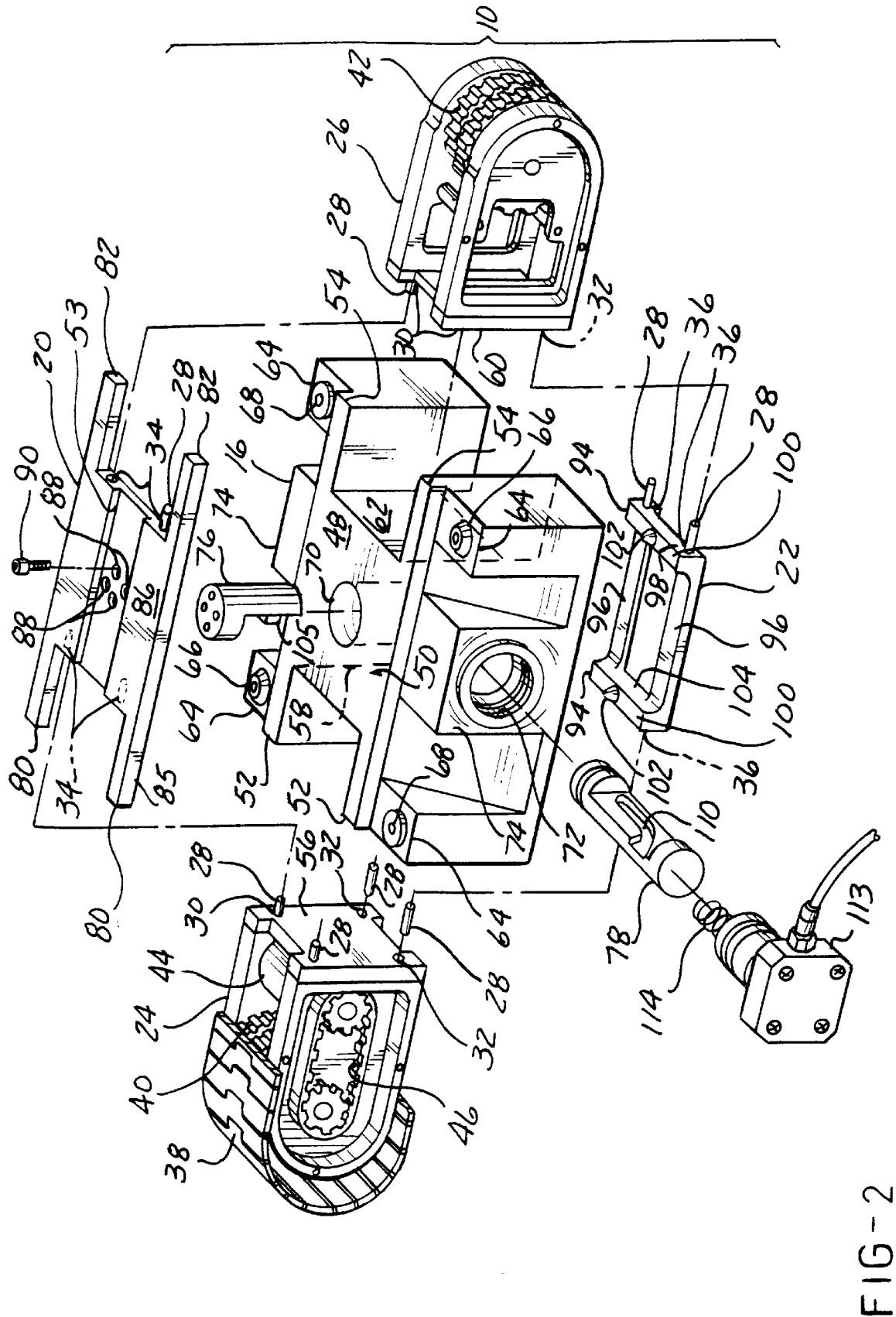
FIG. 2 is an exploded view of the pallet transfer and clamping unit including a stationary base, a secondary frame, and a wedge assembly therebetween.

Details of the pallet transfer and clamping unit 10 are discussed in relation to the FIGS. 2–6. (FIG. 2 is a view of the invention turned 180° to view details not seen in FIGS. 1 or 5). The pallet transfer and clamping unit 10 includes a stationary base 16 positioned on a support structure S at the work station W. A secondary movable frame 18 surrounds and interconnects with the main stationary base 16 and moves in vertical relationship to the stationary base 16.

The secondary frame 18 includes four main components. The secondary frame includes an upper plate 20, a lower plate 22, and two end sprocket components 24 and 26 respectively. The two end sprocket components 24, 26 each house a sprocket 40, 42 respectively. The two end sprocket component 24 and 26 are attached to the upper and lower plates 20 and 22 respectively by fastening means 28 such as bolts and pins, or other comparable securing means. The two end sprocket components 24 and 26 each have a pair of upper apertures 30 and a pair of lower apertures 32. The upper apertures 30 of the sprocket components 24, 26 are secured to corresponding apertures 34 in the upper plate 20 and the lower apertures 32 of each sprocket components 24, 26 are secured to corresponding apertures 36 in the lower plate 22. An endless conveyor 38 is trained around the sprockets 40, 42. Only a fragmentary portion of the endless flat top chain conveyor 38 is shown in FIG. 2 in order to show the sprockets 40, 42 and a drive motor 44. The drive motor 44 actuated by hydraulic fluid or other means drives an internal chain link conveyor 46 to actuate first sprocket 40. The first sprocket 40 moves the endless flat top chain conveyor 38 which then actuates the slave sprocket 42.

The stationary base 16 has an upper planar surface 48 having a generally H-shaped configuration having a center square portion 50 and two pairs of extending members 52 and 54 extending in opposing directions therefrom. The first sprocket component 24 having drive sprocket 40 therein is disposed between pair of extending members 52. The first sprocket component 24 is not connected to the stationary base 16, but has an inner vertical face 56 that is in face to face alignment with a vertical face 58 of the stationary base 16 located between the two extending members 52. Similarly, the second sprocket component 26 having slave sprocket 42 therein is disposed between pair of extending members 54. Second sprocket component 26 has a vertical face 60 that is in face to face alignment with vertical face 62 of stationary base 16 located between the two extending members 54. Each extending member 52 and 54 have further extending portions forming four corners 64 of the stationary base 16. On each corner 64 on the stationary base 16 is a pallet locator 66 and 68. The pallet locators 66, 68 will be discussed further. An aperture 70 is formed in a central location of the generally square portion 50 of the stationary base 16. The aperture 70 forms a cavity within the stationary base 16 for receiving a first cylinder 76. A horizontal through aperture 72 extends through sides 74 of the stationary base 16 forming a through cavity for receiving a second cylinder 78. The first and second cylinders 76 and 78 respectively together form a wedge assembly 79 which will be discussed further.

The upper plate 20 has a generally H-shaped configuration to correspond with the upper planar surface 48 of the stationary base 16. The upper plate 20 may lay on the upper planar surface 48 but is not connected to the stationary base 16. The upper plate 20 has extending legs 80, 82 laying on the corresponding extending members 52, 54 respectively. The inner vertical faces 56 and 60 of the sprocket components 24 and 26 respectively each have a pair of top apertures 30 corresponding to apertures 34 located on vertical surfaces 84 between the extending legs 80, 82 of the upper plate. The apertures 34 and 30 are configured for receiving the appropriate fasteners 28 to secure the upper plate 20 to the two sprocket components 24, 26. The top surface 86 of the upper plate 20 provides a pathway for the endless conveyor 38 upon which the pallet 14 rests while at the work station W. In the center portion of the top surface 86 of the upper plate 20 are through apertures 88 for receiving fastening bolts 90 to secure the first cylinder 76 thereto. As can be seen from FIG. 2, the first cylinder 76 will move vertically in the vertical aperture 70 as the upper plate 20 moves vertically with the secondary frame 18. The top surface 86 of the upper plate has a slightly indented formation 52 in line with the path of the endless conveyor 38 to provide clearance between the bolts 90 and the endless conveyor 38 and to give the endless conveyor 38 a slightly flexible travel path.

The lower plate 22 has an open square configuration with two opposing ends 94 raised above their adjacent sides 96. The two opposing ends 94 have outwardly facing vertical surface 98. Each vertical surface 98 has a pair of apertures 36 to correspond with bottom apertures 32 on the inner vertical faces 56 and 60 of the sprocket components 24 and 26 respectively. The apertures 32 and 36 are configured to receive the appropriate fasteners 28 to secure the lower plate 22 to the two sprocket components 24, 26. A upper surface 100 of the two opposing ends 94 include guide support pins 102 which will be discussed further. A bottom surface portion 104 of the two opposing ends 94 provides a clearance for the endless conveyor 38.

Figure 3:
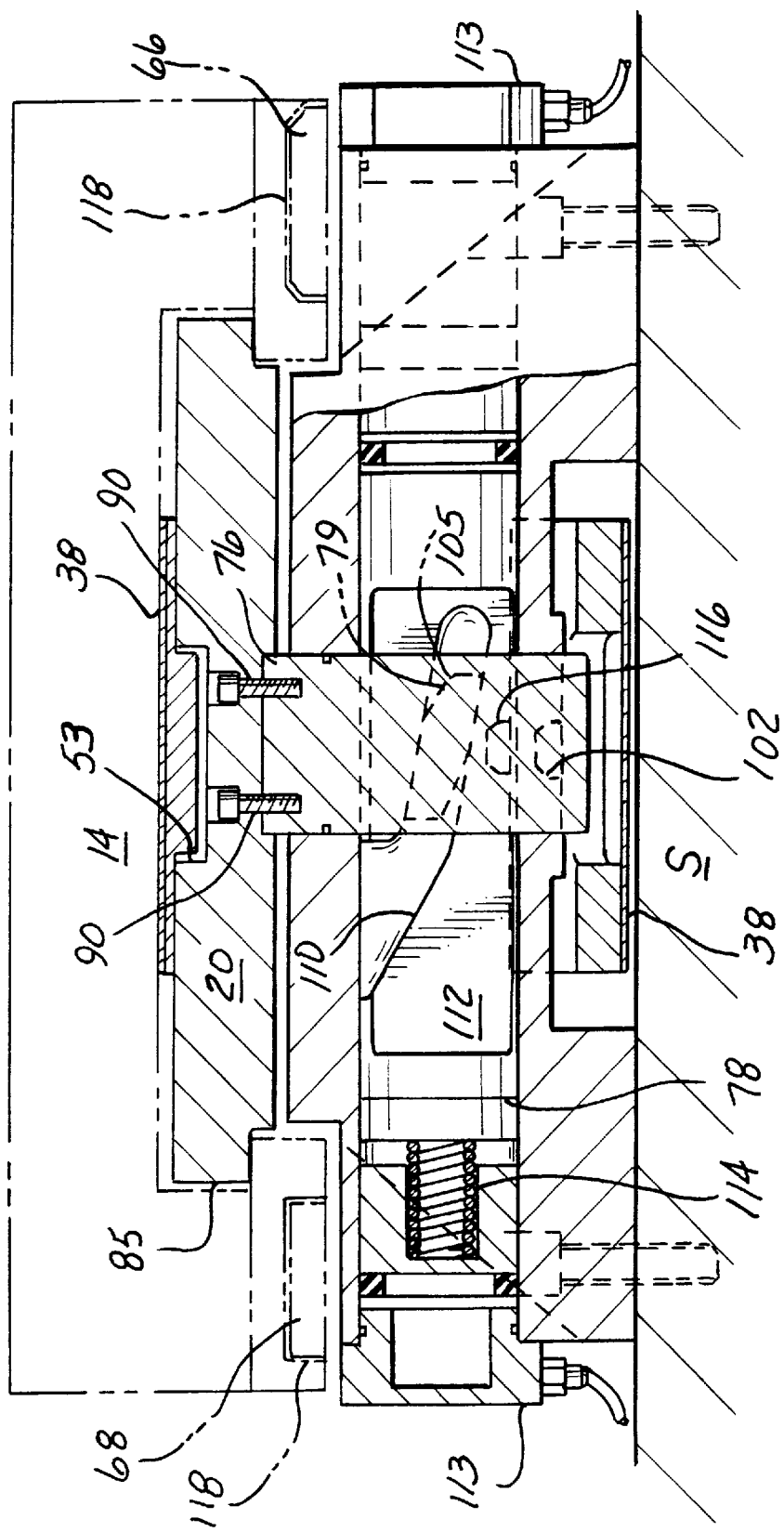
FIG. 3 is a cross sectional view taken in a plane normal to the direction of the conveying movement showing details of the pallet transfer and clamping unit and showing the pallet and secondary frame in the lowered position.
Figure 4:
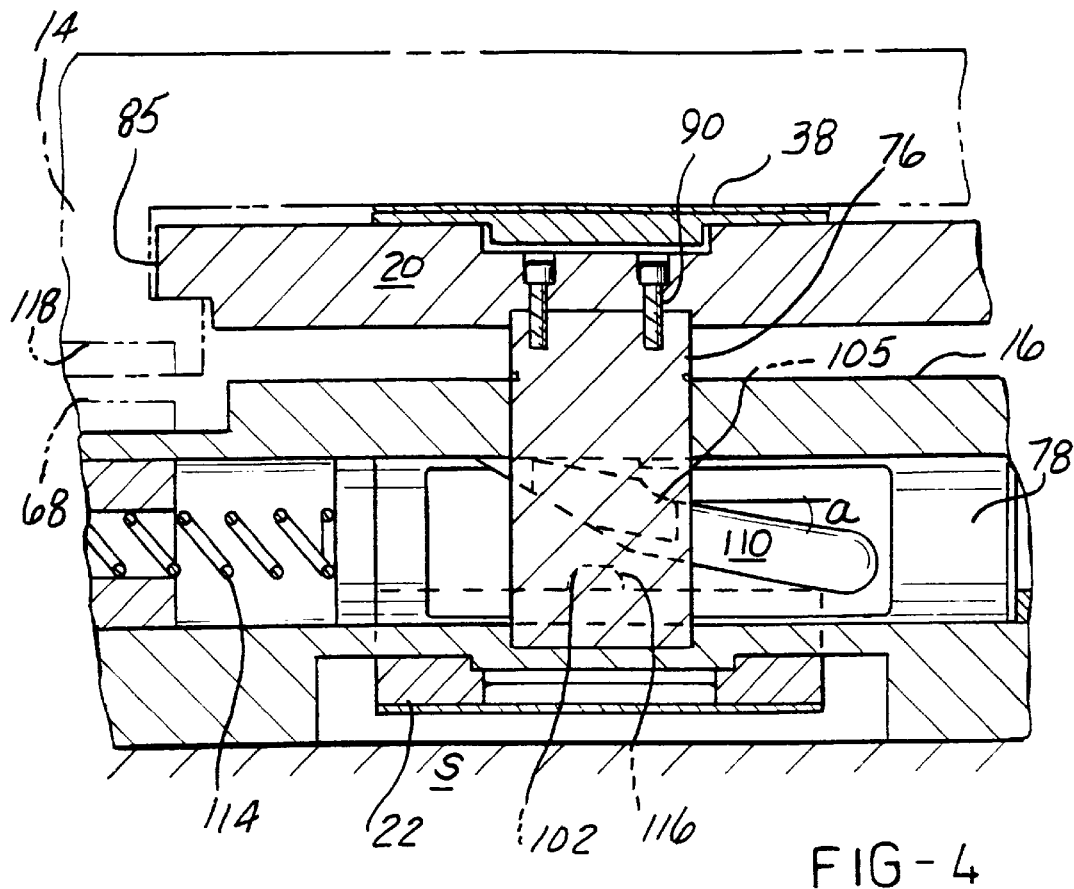
FIG. 4 shows a fragmentary view of the cross sectional view of FIG. 3 showing the pallet and secondary frame in the raised position.

The secondary frame 18 moves in a vertical motion relative to the stationary base 16 by means of the cross locking wedge assembly 79. The cross locking wedge 79 consists of the vertical cylinder 76 attached to the upper plate 20 of the secondary frame 18 and extending into the aperture 70 on the upper planar surface 48 of the stationary base 16; and the horizontal cylinder 78 slidable within aperture 72 of stationary base 16. The vertical cylinder 76 has a longitudinal axis and an arc segment removed along a predetermined length of the longitudinal axis. A wedge 105 extends from an inner surface 106 formed by the removal of the arc segment. The wedge 105 is shown in FIGS. 3 and 4. The horizontal cylinder 78 also has a longitudinal axis and an arc segment removed along a predetermined length of the center portion of the longitudinal axis. The horizontal cylinder 78 has a keyway slot 110 in the inner planar surface 112 formed by removal of the arc segment which is configured to receive the wedge 105. The keyway slot 110 is offset at such an angle α (preferably 10°) relative to the horizontal plane to ensure a positive clamping condition between the pallet transfer and clamping unit 10 and the pallet 14 when the secondary frame 16 is in a lowered position, especially during intense vibration, or loss of clamping actuation pressure when using the alternate embodiment shown in FIG. 6. The wedge assembly 79 is activated by hydraulic means 113 to move the spring loaded horizontal cylinder 78. The spring 114 is biased so that the wedge assembly 79 is in the raised position and therefore the secondary frame 18 is also in a raised position. FIG. 4 shows the relationship of the wedge assembly 79 of the vertical and horizontal cylinders 76 and 78 respectively and the spring 114 when the secondary frame 18 is in the raised position. FIG. 3 shows the relationship of the wedge assembly 79 and the spring 114 when the secondary frame 18 is in its lowered position. When the secondary frame 18 is in its raised position, the endless flat top chain conveyor 38 is in continuous planar alignment with the conveyor system 12. When the secondary frame 18 is in its lowered position, the pallet 14 is in locked alignment to the stationary base 16 so that the necessary work can be applied to the workpiece on the pallet 14.

The lower plate 22 includes upwardly facing conveyor lift guide support pins 102 at the end portions 94 adjacent to the sprocket components 24, 26. The bottom surface of the stationary base 16 includes two complementary located grooves 116 (only one is shown in FIGS. 3 and 4) for receiving the conveyor lift guide support pins 102. The guide pins 102 act as a balance and support for the secondary frame 18 relative to the stationary base 16 so that the secondary frame 18 remains level during the movement of the endless flat chain conveyor 38.

The stationary base 16 includes pallet locators 66, 68 located at upper surfaces of the four corners 64 of the stationary base 16. In the preferred embodiment, two of the diagonally spaced locators 66 are slightly tapered while the remaining two locators retain a flat surface 68. The pallet 14 of the preferred invention is configured to have corresponding underside grooves 118 for receiving the pallet locators 66, 68 when the secondary frame 18 is lowered and locked in position. Looking further at FIGS. 3 and 4, the pallet 24 is further configured to enclose the side edges 85 of the upper plate 20. This configuration maintains the pallet 14 in alignment while traveling over the pallet transfer and clamping unit 10 as well as maintaining the pallet 14 in precise position when the secondary frame 18 is lowered. The pallet 14 is manufactured and set on the conveyor system 12 so that when the pallet 14 arrives onto the pallet transfer and clamping unit 10, the configuration of the grooves 116 in the pallet coincide with the location and configuration of the locator pins 66 and 68 on the stationary base.

In operation, the conveyor system 12 delivers a pallet 14 having a workpiece thereon to the work station W. The pallet transfer and clamping unit 10 is positioned next to the work station W. The endless conveyor 38 will be driven at the same speed as the conveyor system 12. The pallet 14 will travel on the pallet transfer and clamping unit 10 until it hits a stop 17. During this process the pallet transfer and clamping unit 10 is in the raised position, as shown in FIG. 4. A sensor (not shown) communicating with the stop 17 will indicate to the hydraulic motor 113 to drive the horizontal cylinder 78 to move toward spring 114 and thereby retracting spring 114. As the horizontal cylinder 78 moves, wedge 105 in the vertical cylinder 76 moves down the ramp of the keyway slot 110 forcing the attached secondary frame 18 to lower. When the wedge 105 is positioned in the keyway slot 110 as shown in FIG. 3, the pallet locators 66 and 68 will be located in the complementary grooves 118 in the pallet 14. The wedge 105 and keyway slot 110 will provide a locking mechanism to hold the secondary frame 18 stationary in the lowered position, despite the termination of hydraulic pressure to the horizontal cylinder 78. The necessary work to the workpiece can then be applied at the work station W.

After the work or machining has been performed, hydraulic pressure is applied to move the horizontal cylinder 78 away from the spring 114. This process expands spring 114, moves wedge 105 into position shown in FIG. 4 and raises the secondary frame 18 and pallet 14 from the locators 66 and 68. The drive motor 44 is then actuated hydraulically or by other means to circulate the flat top chain conveyor 38 which transfers the pallet 14 and workpiece to the next station or situation. When the secondary frame 18 is raised, the guide support pins 102 link the lower plate 22 of the secondary frame 18 to the stationary base 16 to become one complete assembled unit. This aids the conveyor unit 10 to properly support, in an over hung load condition, the transfer of a pallet 14 and workpiece which may weigh up to 1200 lbs. This support is accomplished by the guide support pins 102 being presented to a mating stationary locator or groove 116 to create a three point support link for the pallet transfer and clamping unit 10.

Figure 6:
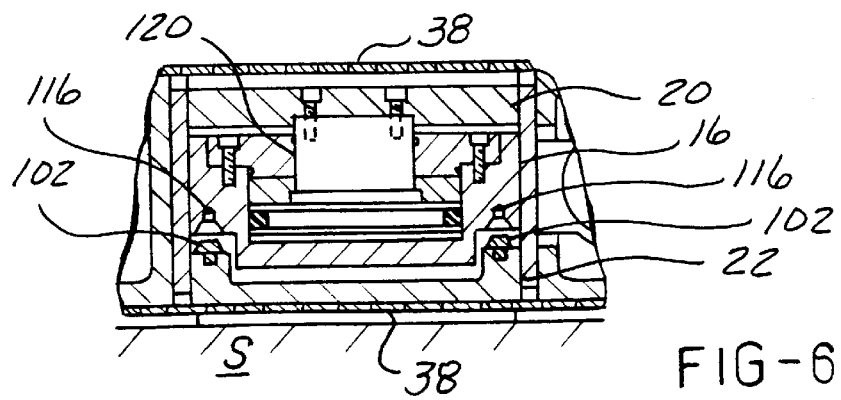
FIG. 6 is a fragmentary sectional side view of the pallet transfer and clamping unit showing another embodiment having a cylinder for raising and lowering the secondary frame.

FIG. 6 shows an alternate embodiment wherein the only change is that a reciprocal cylinder 120, hydraulically driven, replaces the wedge assembly 79 of the preferred embodiment to raise and lower the secondary frame 18. In this embodiment, the hydraulic pressure must remain present when the secondary frame 18 is in the raised position.

Figure 7:
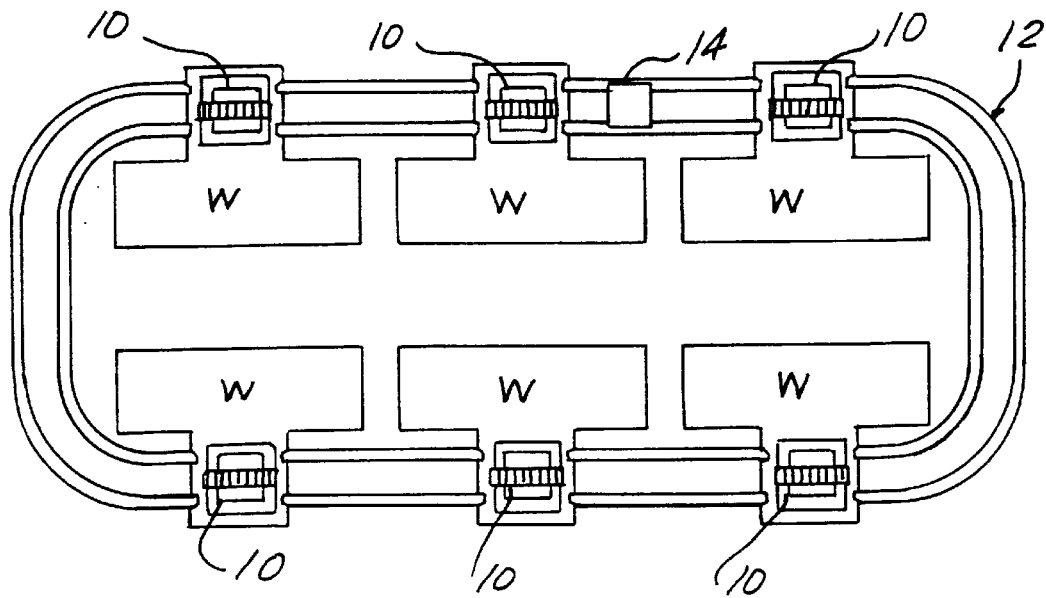
FIG. 7 is a plan view of a typical conveyor system using pallet transfer and clamping units of the present invention.

FIG. 7 shows only one typical configuration of a conveyor system 12 having the pallet transfer and clamping unit 10 of the current invention located at individual work stations W. Other configurations envisioned for the use of this invention include a simple linear conveyor having a start point and an end point which includes a work station; a rotation and pallet loader unit disposed between a cluster of work stations, or a square configuration having rotatable corner bases with work stations interspersed therein. Other configurations or modifications of a conveyor system 12 using the present invention is foreseeable. The modular attribute of the pallet transfer and clamping unit 10 of the present invention allows for a simplified and cost effective means for manufacturers to set up or change their assembly conveyor systems.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular pallet transfer and clamping unit for use with a linear path conveyor system, said unit comprising:
   a stationary base;
   a secondary frame communicating with the stationary base and selectively vertically movable relative to the stationary base;
   a pair of in-line sprockets at opposite ends of the secondary frame;
   an endless conveyor trained around said sprockets and forming a conveying surface on the secondary frame;
   means for driving said sprockets; and
   means for moving said secondary frame relative to the stationary base between a first position wherein said secondary frame is aligned with the linear path of the conveyor system and a second position wherein said secondary frame is located in displaced parallel offset relationship from said first position.

2. The unit of claim 1, wherein said endless conveyor moves with the secondary frame.

3. The unit of claim 1, further comprising means for locking the secondary frame in the second position.

4. The unit of claim 1 in combination with a pallet movable over the linear path and the conveying surface further comprising means for maintaining said pallet at a precise location on the stationary base when the secondary frame is in the second position.

5. The unit of claim 4 wherein the means for maintaining pallet includes locator pins positioned on an upper surface of the stationary base and corresponding complementary grooves located in a bottom surface of the pallet.

6. The unit of claim 1 further comprising means for balancing said secondary frame in communication with the stationary base when said secondary frame is in the first position.

7. The unit of claim 1 wherein the second position is vertically below the first position.

8. The unit of claim 3, wherein said locking means includes a wedge assembly having a vertically disposed cylinder having a wedge key movable relative to a horizontal cylinder having a keyway slot for receiving said wedge.

9. The unit of claim 1, wherein said means for moving said secondary frame relative to the stationary base includes a reciprocally moving cylinder vertically disposed in said stationary base and communicating with said secondary frame.

10. The unit of claim 1, wherein the secondary frame includes an upper plate and a lower plate each communicating with the pair of in-line sprockets, wherein said stationary base is disposed between said upper and lower plates.

11. The unit of claim 1 wherein said means for moving said secondary frame relative to the stationary base includes a horizontal reciprocal cylinder having a keyway slot therein located in the stationary base and a vertical cylinder having a complementary wedge key extending therefrom connected to the secondary frame, said wedge moving relative to the reciprocal movement of the horizontal cylinder for raising and lowering the secondary frame.

12. The unit of claim 8 wherein the keyway slot is angled generally 10° offset from the horizontal cylinder.

13. The unit of claim 5, wherein at least two of the locator pins are tapered.

14. The unit of claim 5, wherein the locator pins are positioned at a peripheral edge of the stationary base.

15. The unit of claim 4 wherein the means for maintaining the pallet includes four locator pins positioned on an upper surface of the stationary base and corresponding grooves located in a bottom surface of the pallet, wherein at least two of the locator pins and two of the corresponding grooves are tapered.

* * * * *